United States Patent [19]

Colson

[11] Patent Number: 4,730,569

[45] Date of Patent: Mar. 15, 1988

[54] ICE FISHING TRANSPORT

[76] Inventor: David Colson, Box 73, Footville, Wis. 53537

[21] Appl. No.: 38,242

[22] Filed: Apr. 14, 1987

[51] Int. Cl.⁴ ............................................. B62B 15/00
[52] U.S. Cl. .................................... 114/43; 280/12 C
[58] Field of Search ................. 280/12 R, 12 A, 12 B, 280/12 C, 12 E, 12 S, 18, 23; 114/75, 255, 256, 343, 351, 361, 364, 43; 441/35, 38, 129

[56] References Cited

U.S. PATENT DOCUMENTS

| | | |
|---|---|---|
| 861,607 | 7/1907 | Pfeifer .................................... 114/43 |
| 1,585,575 | 5/1926 | Van Husan . |
| 1,929,833 | 10/1933 | Van Vuren .......................... 114/75 |
| 2,681,809 | 6/1954 | Hamill . |
| 2,735,690 | 2/1956 | Paden et al. ....................... 280/12 B |
| 2,747,204 | 5/1956 | Erickson et al. .................... 114/351 |
| 3,030,122 | 4/1962 | Madera . |
| 4,438,940 | 3/1984 | Hunt ................................. 280/12 C |
| 4,456,272 | 6/1984 | Kroeger ............................ 280/12 C |

Primary Examiner—Sherman D. Basinger
Assistant Examiner—Stephen P. Avila
Attorney, Agent, or Firm—Andrus, Sceales, Starke & Sawall

[57] ABSTRACT

An ice fishing transport for transporting ice fishing equipment and supplies to and from an ice fishing site, in which the ice fishing equipment and supplies are stored within one or more containers, includes a substantially flat bottom surface for supporting the containers during transportation, and a top surface spaced from and connected to the bottom surface. The top surface is provided with retainer means, such as openings, adapted to receive the containers for maintaining the containers in position on the bottom surface during transportation. A compartment is provided in one end of a transport for housing additional ice fishing supplies.

4 Claims, 3 Drawing Figures

ICE FISHING TRANSPORT

BACKGROUND AND SUMMARY

This invention relates to a device for transporting articles, and more particularly to a device for transporting articles over frozen surfaces such as ice or snow.

In the sport of ice fishing, it is necessary to transport various pieces of equipment and paraphernalia to and from the ice fishing site. Such equipment may include an ice auger, a portable heater, a fishing rod and tackle, and bait. In addition, many ice fishermen carry an insulated container or the like for a warm beverage. Transporting these items to and from the ice fishing site can be a difficult undertaking.

It has been known to use a one-piece molded plastic shell-like sled having a flat bottom, to assist the ice fisherman in transporting equipment. Use of such a sled aids in transportation, but can result in arrival at the site with the various items in an unorganized state due to jarring and bouncing during the trip. This is especially so if the frozen surface over which the equipment is being transported, such as a frozen lake or river, presents an uneven surface. In such a case, there is also a danger that the equipment will spill out of the sled when passing over the uneven surface.

It is also known to store the ice fishing equipment in buckets or other containers during transportation to the site. This keeps the equipment somewhat organized, but does not eliminate the problems encountered when the sled passes over an obstruction or uneven surface. In such a case, the buckets may be upset and their contents spilled.

The present invention is designed to solve the noted problems, serving as a means for providing secure transportation of ice fishing equipment to and from the site. In accordance with the invention, an ice fishing transport for transporting equipment contained within one or more containers to and from an ice fishing site is provided with a substantially flat bottom surface for supporting the containers during transportation. The bottom surface is adapted to glide smoothly over frozen surfaces, such as ice and snow. The transport is further provided with a top surface spaced from and connected to the bottom surface. The top surface includes retainer means adapted to receive the containers, for maintaining the containers in position on the bottom surface during transportation. In one embodiment, the retainer means comprises openings formed in the top surface. The size of the openings corresponds closely to the size of the containers, so that the containers are held snugly within the openings to prevent more than a small amount of movement of the containers during transportation. The transport may be provided with a compartment disposed in one end thereof for storage of supplies, such as bait, during transportation. Provision of such a compartment allows the ice fisherman to further organize equipment and supplies for providing an organized arrival at the site.

The invention thus provides a top surface spaced from and connected to a bottom surface, on which the containers rest. The top surface provides stability to the containers as they rest on the bottom surface. This stabilization of the containers during transportation reduces the chances that the ice fishing equipment will spill out during passage of the transport over an uneven surface.

BRIEF DESCRIPTION OF THE DRAWINGS

The drawings illustrate the best mode presently contemplated of carrying out the invention.

In the drawings.

DETAILED DESCRIPTION

Figure 1:
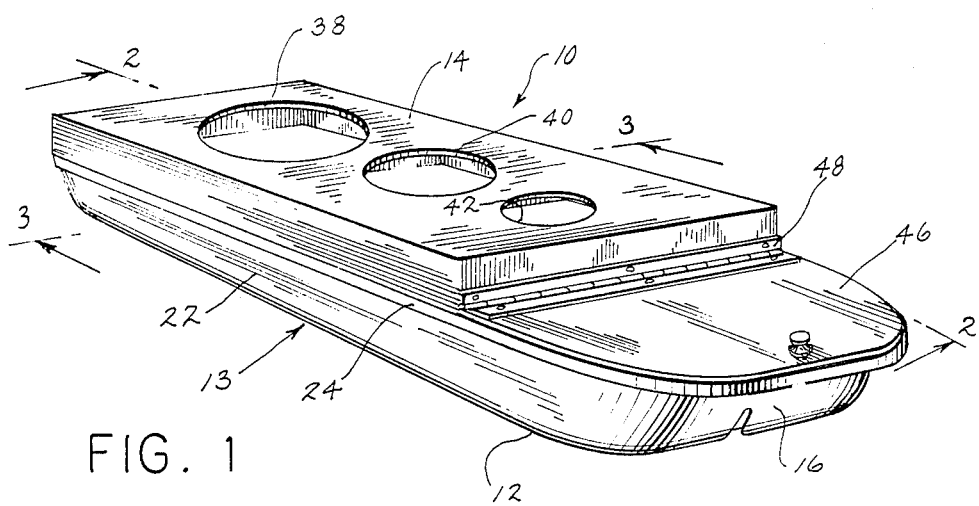
FIG. 1 is a perspective view of an ice fishing transport according to the invention.

As shown in FIG. 1, an ice fishing transport 10 includes a bottom surface 12 and a top surface 14. Top surface 14 is spaced from and connected to bottom surface 12. Bottom surface 12 is part of a one-piece molded plastic shell-like sled 13 including a front wall 16 and a rear wall 18, FIG. 2, and respective right and left walls 20 and 22, FIG. 3. A depending lip 24 is provided at the top of walls 16, 18, 20 and 22, and extends around the entire periphery of the one-piece molded plastic sled 13.

Top surface 14 is supported by a frame structure including respective right and left side longitudinal members 26 and 28, with cross members 30, 32, 34 and 36 spanning therebetween and connected thereto. Top surface 14 may be constructed of any suitable material, such as plastic or plywood. Right and left side members 26, 28 and cross member 30 are connected to the one-piece molded plastic sled by means of a suitable fastener, such as screws.

Ice fishing transport 10 is provided with a tow rope (not shown) or similar means by which the transport 10 may be hauled across frozen surfaces such as ice or snow.

Top surface 14 is provided with one or more openings, shown in the drawings at 38, 40 and 42. The openings 38–42 are adapted to receive the buckets or other containers in which the ice fishing equipment is stored during transportation, shown in phantom in FIG. 2 at 43. Openings 38–42 are of an appropriate size so that the containers fit relatively snugly within the openings, as shown. Such a fit prevents more than a small amount of movement of the buckets during transportation, to minimize the threat of spilling the contents.

As shown in the drawings, openings 38–42 are of varying diameters, to accommodate different size buckets. For example, opening 38 is adapted to receive a conventional 5-gallon bucket, whereas opening 42 is adapted to receive an insulated beverage container. The sizes of the openings may be varied according to the needs of the user.

Figure 2:
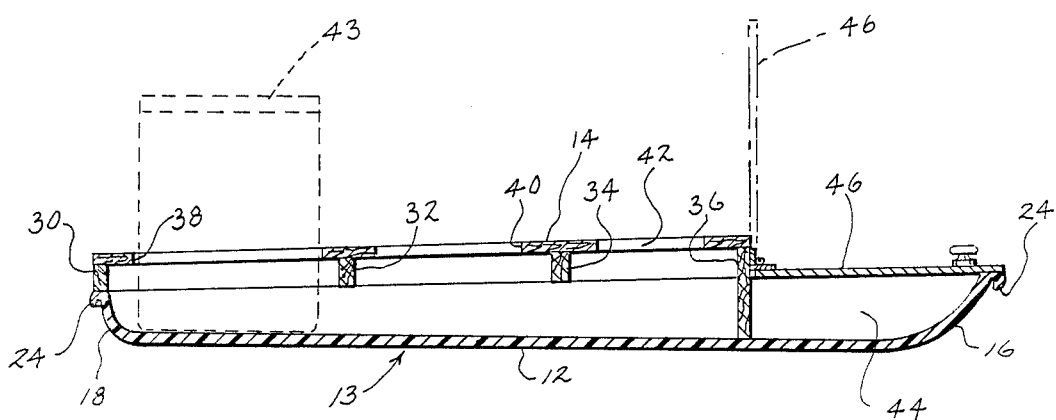
FIG. 2 is a sectional view of the transport taken generally along line 2—2 of FIG. 1.
Figure 3:
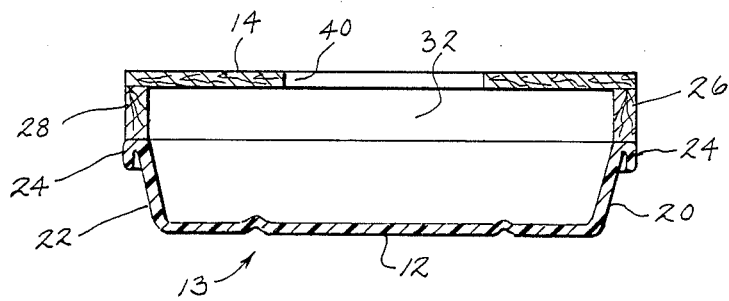
FIG. 3 is a sectional view of the transport taken along line 3—3 of FIG. 1.

As shown in FIG. 2, cross member 36 extends the full depth of the one-piece molded plastic sled 13 to bottom surface 12. This forms a compartment 44 in the front end of transport 10, for storage of ice fishing supplies during transportation. Side walls 20, 22 and front wall 16 form the remaining sides of compartment 44. Cross member 36 acts to seal compartment 44 from the interior of sled 13 which is covered by top surface 14.

Compartment 44 is covered by a movable top 46 for providing access to the interior of compartment 44. Top 46 is pivotable between open and closed positions, as shown in FIG. 2, by means of a strip hinge 48 connecting top 46 to cross member 36. Pivotable top 46 may comprise a section of top surface 14.

As shown in the drawings, top surface 14 extends across the entire width of the one-piece molded plastic sled 13, but extends less than the full length of sled 13. As shown, compartment 44 occupies the remainder of the length of sled 13.

The present invention thus provides a closed-sided structure for transporting ice fishing equipment to and from an ice fishing site. By the present invention, ice fishing supplies can be transported to and from the ice fishing site in an organized manner, thus reducing confusion and disorganization upon arrival.

Various alternatives are contemplated as being within the scope of the following claims particularly pointing out and distinctly claiming the invention.

I claim:

1. An ice fishing transport for transporting ice fishing equipment to and from an ice fishing site, said ice fishing equipment being contained within one or more containers, comprising:

a substantially flat bottom surface for supporting said containers during transportation, said bottom surface being adapted to glide over frozen surfaces; and a top surface spaced from and connected to said bottom surface, said top surface including one or more openings disposed therein, said openings being adapted to receive said one or more containers, and wherein said containers fit relatively snugly within said openings so as to prevent more than a small amount of movement of said containers during transportation for maintaining said containers in position on said bottom surface during transportation.

2. An ice fishing transport for transporting ice fishing equipment to and from an ice fishing site, said ice fishing equipment being contained within one or more containers, comprising:

a substantially flat bottom surface for supporting said containers during transportation, said bottom surface being adapted to glide over frozen surfaces; and a top surface spaced from and connected to said bottom surface, said top surface including retainer means adapted to receive said one or more containers for maintaining said containers in position on said bottom surface during transportation;

wherein said bottom surface comprises a one-piece molded plastic shell including a flat bottom having upstanding side walls extending therefrom about the periphery of said shell, and wherein said top surface spans between and is connected to said upstanding side walls, said top surface extending across the width of said shell and extending less than the full length of said shell, and wherein the remainder of the length of said shell is provided with a compartment having a movable top for providing access thereto.

3. The invention according to claim 2, wherein said compartment is provided with an upstanding transverse wall extending between said side walls of said shell for sealing said compartment from the interior of said shell covered by said top surface.

4. An ice fishing transport for transporting ice fishing equipment to and from an ice fishing site, said ice fishing equipment being contained within one or more containers, comprising a closed-sided structure having a top, a bottom, and end walls and side walls extending between said top and bottom and connected thereto, said bottom comprising a substantially flat surface for supporting said containers and being adapted to glide over frozen surfaces, said top having one or more openings therein adapted to receive said containers for maintaining said containers in position on said bottom during transportation, said openings providing a relatively close fit between said top and said containers for preventing more than a small amount of movement of said containers during transportation, said transport having at least one compartment disposed in one end for storage of ice fishing supplies during transportation, said bottom of said transport comprising the bottom of said compartment and said side walls and one of said end walls of said transport comprising the sides and one end of said compartment, respectively, the other end of said compartment comprising an upstanding transverse end wall extending between said side walls of said closed-sided structure and spaced from said one end wall of said transport, said compartment being provided with a pivotable top for providing access to the interior of said compartment.

* * * * *